United States Patent Office 2,772,980
Patented Dec. 4, 1956

2,772,980

PREPARATION OF ANIMAL BRAINS

Jean N. Lesparre, Chicago, and Chester J. Filipowicz, Lockport, Ill., assignors to Armour and Company, Chicago, Ill., a corporation of Illinois No Drawing. Application November 28, 1952, Serial No. 323,154

8 Claims. (Cl. 99—194)

This invention relates to the treatment of brains and more particularly to a process for preparing edible frozen brains, as well as relating to the product of said process.

In the preparation of calf, beef, lamb, mutton and pork brains for edible purposes, the removal of blood clots and accumulations which are usually deeply imbedded in the folds and crevices of the brain tissues is a difficult and tedious procedure. The effective separation and removal of such material is of prime consideration with regard to the color, flavor, odor, texture, and appearance of the product in so far as consumer acceptance is concerned.

Heretofore, conventional preparation procedures for edible brains have not been satisfactory principally because residual accumulations of blood, bone dust and other undesirable components have not been completely eliminated prior to distribution of the processed material for consumer use. The appearance of these undesirable substances during cooking and subsequent serving of the product adversely affects the palatability, flavor, color, odor and quality as well as the physical appearance of the cooked product. The unremoved blood accumulations are also thought to be responsible for an accelerated development of off-flavors and odors in brains which have been storaged under refrigeration over a period of time.

Another factor contributing to the difficulty in effectively processing brains is the soft, fragile and delicate structure of brain tissues. In view of a marked tendency toward physical disintegration or collapse of the brain mass particularly during and following removal of the outer protective membrane or dura mater, special care must be exercised in the processing techniques. Accordingly, the use of means such as excessive pressures, rapid agitation, or other relatively drastic methods cannot be satisfactorily employed in effecting a thorough separation and removal of the deeply imbedded blood clots and accumulations.

Accordingly, it is an object of the present invention to provide a means of processing beef, lamb, mutton, pork and calf brains whereby palatability, flavor, odor, etc., of the product are improved by virtual elimination of all imbedded accumulations of blood and similar contaminants from the folds and crevices of the brain. It is another object to provide a method for processing brains whereby a clear white color is imparted to the brains. It is still another object to provide a method of treating brains whereby keeping qualities of frozen brains are improved over extended periods of time without discoloration, off-flavor and odor development. It is yet another object to provide a method for "conditioning" brain tissue to produce a brain product of increased texture and firmness whereby slicing, dicing, blanching, breading, etc., may be performed prior to freezing without disintegrating the brain mass. It is still a further object of this invention to provide a frozen brain product having a mildly sweetened taste. Another object is to make available a packaged, ready-to-cook, frozen brain product which may be prepared for serving by the consumer in minimum time and with greatly reduced effort. These and other objects and advantages will be apparent as the specification proceeds.

In accordance with the present invention, brains are contacted over a period of time with aqueous solutions containing sodium chloride and sodium citrate and this treatment is followed by a blanching step. This combination of treatments gives many advantages. In the first place, a loosening and dissolving effect is produced upon the blood accumulations within the folds and crevices of the brain. Secondly, a conditioning of the brain tissue mass is obtained. By the term "conditioning" as used herein is meant an increase in firmness or texture of the brain mass to an extent where the originally soft tissue, following treatment with the above solutions and subsequent blanching, becomes comparatively more rigid, and relatively resistant to disintegration or collapse. Thirdly, when the blanching step is preceded by the treatment with sodium citrate, the blanched brain product has an attractive white appearance which can be maintained indefinitely under proper refrigerating conditions. Finally, a semi-sweentened taste is imparted to the blanched product which enhances the palatability of beef, lamb, mutton, pork and calf brains.

In the ordinary processing of brains, the conventional methods of washing to remove the blood and bone dust have resulted in a product which required considerable further handling on the part of the consumer prior to cooking and serving. Despite these extended efforts by the consumer, the previously mentioned factors including discoloration, inferior palatability and appearance, off-flavor, etc., cannot be satisfactorily overcome. In addition, the softness of the brain tissue frequently resulted in the loss of a substantial portion of the material during handling. This loss, caused by disintegration or collapse of the brain tissue, is particularly marked when the tissue has been previously refrigerated or kept over a period of time prior to processing for consumption.

In carrying out our process, the brains may be removed as soon as possible from the animal and soaked in clear, cold running water. While soaking the brains, the outer membrane referred to as the dura mater, may be removed by making an opening between the tissue and the membrane at the side of the brain in the region of the cerebellum. The removal of the membrane is facilitated by flushing a water stream between the tissue and the brain while working carefully with the finger starting from the opening in the back toward the inside of the brains from the left lobe and then to the right lobe up to the top and outside of the brains. In this manner, the membrane may be completely removed in one operation with no damage to the brain mass.

When brains are removed from the animals, there is a considerable quantity of blood between the brain tissue and the covering membrane. Although removal of the outer membrane while soaking and flushing the brain causes removal of a good portion of this blood, there still remains a quantity of blood in the form of clots or accumulations deep in the folds and crevices of the brain. This residual blood must be removed since its presence in the brain causes discoloration, off-flavor, and odor development as previously discussed. The discoloration effect becomes particularly pronounced during the subsequent blanching step described below.

After the membrane has been removed, we may soak the brains in a 1.5% aqueous solution of sodium chloride for about 45 minutes. The brains are then removed from the sodium chloride solution and immersed in a 1.5% aqueous solution of sodium citrate for about 45 minutes of additional soaking. During the latter two operations, the solutions are usually maintained between 50 to 75° F. and a uniform distribution is facilitated by stirring the solutions. The brains are removed from the soaking bath and rinsed under a cold water spray while working with the fingers between the crevices of the brain tissue to remove the last traces of blood or bone dust. Care must be taken to avoid rupturing the protective tissue of the brain mass. When the brains are thoroughly clean, they are drained as by basket draining prior to blanching.

The blanching operation involves dropping the drained brains in hot water at about 200 to 212° F. containing approximately 5% by weight of white vinegar. When using 40 pounds of such blanching solution per 10 pounds of drained brains, the blanching time used is determined by allowing the temperature of the blanching solution (heat off) to cool to about 125° F. and then maintaining this temperature for an additional period of 10 to 15 minutes. The brains are then drained and chilled to about 40° F. by immersion in cold water to complete the blanching.

The brains can then be packaged in suitable quantity units and blast-frozen at a temperature such as —40° F. The frozen product which has an excellent white color and taste may be kept indefinitely under refrigeration at 0 to 5° F. with no impairment of color, taste, texture and appearance.

The temperature of the sodium chloride and sodium citrate solutions may vary broadly as from usual cold water temperatures up to about 100° F. although we prefer to operate at temperatures between 50 and 75° F. and still more preferably at about 65° F.

The concentration of sodium chloride in water may be adjusted from about 0.5 to 5% by weight although it is preferred to use solutions containing from 1 to 3% and optimally about 1.5%. Sodium citrate solutions of the same concentration ranges may be satisfactorily employed in the process. The contact time for the brains immersed in these solutions may be varied from 15 minutes to over an hour. At temperatures around 65° F. and concentrations of approximately 1.5%, we prefer to use immersion periods of about 30 to 50 minutes and best results are attained through soaking periods of approximately 40 minutes. Calf brains, for example, are satisfactorily cleaned and conditioned in less time than that required in the case of brains from older animals as beef cattle, etc.

The superior results obtained through the use of sodium chloride and sodium citrate in combination with the blanching step give a color effect which cannot be explained. It has been found, for example, that when the sodium citrate immersion step is omitted from the procedure, a substantially darker blanched product is obtained and the brains have relatively inferior flavor and texture characteristics. Also, the previously mentioned semi-sweetened taste which is similar to that produced by mono-sodium glutamate, which is frequently used for flavoring purposes, is no longer evident upon omission of the sodium citrate treatment.

By way of variation, an excellent product is obtained when the sodium chloride and citrate solutions are combined for use together. Thus, a typical solution containing about 3% by weight of combined salts (1.5% by weight of each salt) may be used successfully by soaking the brains for 1 to 2 hours at about 50 to 75° F. thereby eliminating a procedural step if desirable.

Other blanching media and procedures may be employed in conjunction with the processing of brains herein described. For example, aqueous solutions containing acetic or citric acid, regular vinegar, etc. may be effectively used. The preferred blanching solution, however, consists of 1 to 8% by weight of white vinegar (90–100 grain) and optimum results are obtained through the use of an aqueous solution containing about 5% by weight of white vinegar.

Although the thorough cleaning and processing of brains may be accomplished by various means in the production of frozen packaged brains, it is believed that the process which utilizes sodium chloride, sodium citrate and white vinegar described herein interact in some manner to accomplish this purpose most satisfactorily. The effect of these substances is apparently combined to make possible the production of fresh or frozen brains having superior texture, flavor, color, appearance and stability characteristics.

The invention will be further illustrated but is not limited by the following examples:

Example I

Fresh beef brains are washed in cold running water to remove blood, bone dust and other contaminants. During the preliminary washing, the dura mater is removed by manipulating the membrane with the finger while flushing the water between the membrane and the brains.

The brains are immersed in a brine solution containing 1.5% by weight of salt for 45 minutes after which they are drained and reimmersed in 1.5% aqueous solution of sodium citrate for the same period of time. The solutions were stirred while in use and both temperatures varied between 60–70° F.

The brains were removed and rinsed under a cold water spray, care being exercised to flush out the last traces of blood and bone dust accumulations from the brain folds and crevices after which the brains are basket drained.

The well drained brains are then dropped into a boiling solution containing 5% of 90-grain white vinegar. A uniform control of the blanching step is kept by using a 4:1 ratio by weight of blanching solution to well drained brains, allowing the boiling solution to cool down to about 125° F. after adding the brains and then maintaining the 125° F. temperature for an additional 10 to 15 minutes by the use of steam or any heating means if necessary. The pre-cooked brains are drained and chilled to about 40° F. with cold water.

The pre-cooked brains, following draining, are sliced, breaded or otherwise processed as desired and packaged. The packaged units are blast-frozen at —40° F. and subsequently kept under refrigeration at temperatures of about 0° F.

Example II

Fresh beef brains were processed as in Example I with the modification wherein the sodium chloride and sodium citrate solutions were combined. In this procedure, the brains were immersed in a single solution containing 1.5% salt and 1.5% sodium citrate and soaked for a period of 75 minutes at 65 to 70° F. The remainder of the process was substantially the same as that described in the preceding example. The final product had a fine clear white color and could not be distinguished from the brains processed by the two-step immersion method.

Example III

Fresh calf brains were washed in cold running water for 1.5 hours during which time the dura mater was removed. The outer membrane-removed brains were immersed in brine (1.5% by weight NaCl) for 30 minutes at 50 to 60° F. This was followed by a similar soaking of the brains in an aqueous solution maintained between 50 and 65° F. and containing 1.5% by weight of sodium citrate.

The drained pre-cooked brains were packaged in several forms including plain whole brains, slices, diced cubes, and also as breaded calf brains. The packaged brains were blast frozen at —40° F. and stored under ordinary refrigeration conditions.

While in the foregoing specification specific embodiments of the present invention have been set forth in considerable detail for the purpose of illustration, it will be apparent to those skilled in the art that many of the details set forth can be varied widely without departing from the spirit of the invention.

We claim:

1. The process of treating animal brains which comprises the steps of cleaning and conditioning the brains in sodium chloride and sodium citrate solutions and thereafter blanching the brains.

2. The process of treating animal brains which comprises the steps of cleaning and conditioning the brains in sodium chloride and sodium citrate solutions and thereafter blanching and freezing said brains.

3. The process of treating animal brains which comprises the steps of cleaning and conditioning the brains in sodium chloride and sodium citrate solutions and thereafter blanching the brains in vinegar and freezing the product.

4. The process of treating animal brains which comprises the steps of immersing the outer membrane-removed brains in an aqueous solution of sodium chloride, repeating the immersion in an aqueous solution of sodium citrate, blanching the washed brains in a vinegar solution and freezing the product.

5. The process of treating animal brains which comprises the steps of immersing the outer membrane-removed brains in an aqueous solution containing about 1 to 3% by weight of sodium chloride, repeating the immersion in an aqueous solution containing about 1 to 3% by weight of sodium citrate, blanching the washed brains in an aqueous solution of vinegar at temperatures between 212 and 125° F. and freezing the product.

6. The process of treating animal brains which comprises the steps of immersing the outer membrane-removed brains in an aqueous solution containing about 3% by weight of approximately equal amounts of sodium chloride and sodium citrate, blanching the washed brains in an aqueous solution containing about 5% by weight of vinegar at temperatures between 212 and 125° F. and freezing the blanched product.

7. In a process for treating calf brains following removal of the dura mater, the steps comprising immersing the brains for a period of about 30 to 75 minutes in brine containing about 1.5% by weight of salt, immersing the brains for about the same period in an aqueous solution containing about 1.5% by weight of sodium citrate, blanching the washed brains at temperatures between 212 and 125° F. in 5% by weight of white vinegar solution, comminuting the blanched brains, breading the product and freezing the mixture.

8. In a process for treating animal brains, the steps of cleaning and conditioning said brains in an aqueous solution containing salt and sodium citrate and thereafter blanching the brains.

References Cited in the file of this patent

"Everybody's Cook Book," 1937, by I. E. Lord, published by Harcourt, Brace and Company, New York, page 518, article entitled Calf's Brains, Lamb's Brains, Sheep's Brains.

"The Chemistry and Technology of Food and Food Products," 1944, by M. B. Jacobs, published by Interscience Publishers, Inc., New York, page 314.

"The Gourmet Cook Book," 1950, published by Gourmet Distributing Corporation, 768 Fifth Avenue, New York 19, New York, page 410.